United States Patent [19]

Peck

[11] Patent Number: 4,714,281

[45] Date of Patent: Dec. 22, 1987

[54] DEVICE AND METHOD FOR TYING A TWISTED CLINCH KNOT

[76] Inventor: Richard M. Peck, 3113 Club Dr., Allentown, Pa. 18103

[21] Appl. No.: 178

[22] Filed: Jan. 2, 1987

[51] Int. Cl.⁴ .............................................. B65H 69/04
[52] U.S. Cl. ........................................ 289/1.5; 289/17
[58] Field of Search ......................... 289/1.2, 1.5, 2, 3, 289/17, 18.1

[56] References Cited

U.S. PATENT DOCUMENTS

| | | | |
|---|---|---|---|
| 1,838,957 | 12/1931 | Orawiec | 74/127 |
| 2,071,525 | 2/1937 | Higgins et al. | 289/3 |
| 2,220,530 | 11/1940 | Lauterbach | 242/7 |
| 2,734,299 | 2/1956 | Masson | 43/1 |
| 2,859,994 | 11/1958 | Whitlinger | 289/17 |
| 2,967,372 | 1/1961 | Pass et al. | 43/43.13 |
| 3,131,957 | 5/1964 | Musto | 289/17 |
| 3,396,998 | 8/1968 | Scoville | 289/17 |
| 3,520,566 | 7/1970 | Bovigny | 289/17 |
| 3,521,918 | 7/1970 | Hammond | 289/17 |
| 3,575,449 | 4/1971 | Browning | 289/17 |

Primary Examiner—Louis K. Rimrodt

[57] ABSTRACT

A hand-held device for tying a twisted clinch knot includes a worm shaft, a handle defining a recess shaped to receive the shaft, a first stop for determining a forwardmost position of the shaft relative to the handle and for retaining a first end of the shaft within the handle, a hook located on a second forward end of the shaft, and a protrusion located on an interior wall of the handle that is received within threads of the shaft. A method for tying a twisted clinch knot includes the steps of providing the aforementioned device, attaching the hook to an article to which a line is to be secured, advancing an end portion of the line through an opening defined by the article, rotating the shaft about the protrusion while holding the handle on one side of the opening and while holding the end portion and a next adjacent end portion of the line on the other side of the opening, and passing a part of the end portion through a loop of the line that passes through the opening.

15 Claims, 8 Drawing Figures

DEVICE AND METHOD FOR TYING A TWISTED CLINCH KNOT

BACKGROUND OF THE INVENTION

1. Field of the Invention

The present invention is a method and apparatus for tying a twisted clinch knot to secure a fishing line to a fishhook, swivel, leader, snelled hook, flier, streamer, eyelet or the like.

2. Discussion of the Related Art

In order to secure a fishhook or the like to a fishing line, a twisted clinch knot is typically formed by extending a short length of line through an opening in the article to be secured, twisting the short length of line several times around an adjacent portion of the rest of the line, and looping the end of the short length of line through an opening formed immediately adjacent to the hook. The knot so formed is very effective and will not come untied.

Unfortunately, the tying of such a knot in the field by hand is difficult and often very frustrating. The materials used in the manufacture of fishing lines are usually stiff and resilient and are not easily deformed and twisted as necessary to form the knot. Compounding this problem are the poor conditions a fisherman may encounter in the field, including cold and wet weather, precarious footing, lessened visibility due to low light or bad weather, and the inability to devote both hands to the tying process for extended periods of time. Several of these conditions may occur simultaneously.

The problem of conveniently tying a twisted clinch knot has not gone unrecognized in the prior art. A number of devices and related methods have been proposed as solutions. U.S. Pat. No. 3,131,957, issued to Musto, describes a knot-tying tool which includes an elongated tubular member having a slit in one end and a handle secured to the other. Fishing line is threaded through the slit and through the hook, and then repeatedly wrapped about the tubular member. The line is subsequently passed through the tubular member and out of the slit, whereupon the line is removed from the member to form the knot. U.S. Pat. No. 3,575,449, issued to Browning, is similar in that it involves a tubular member about which is wrapped the fishing line. The member is provided with a clamping means at one end to secure an end of the line during the tying process. Other devices, not intended to be hand-held, have been described for tying fishing lines.

Despite the many efforts in the prior art, the problem of conveniently and effectively tying a fishing line with a hand-held device remains unsolved. It is accordingly an object of the present invention to provide a hand-held fishing line tying device that is capable of conveniently and effectively tying a twisted clinch knot under field conditions.

A further object of the invention is to provide a hand-held fishing line tying device that is simple, inexpensive to manufacture, trouble-free and easy to use.

A further object of the invention is to provide a method of using the tying device to tie the line in the aforestated manner.

Further objects of the invention will become readily apparent from the foregoing detailed description.

SUMMARY OF THE INVENTION

In order to satisfy the aforestated objectives, the present invention provides a hand-held device for tying a twisted clinch knot that includes a worm shaft, a handle defining a recess shaped to receive the shaft, a first stop for determining a forwardmost position of the shaft relative to the handle and for retaining a first end of the shaft within the handle, a hook located on a second forward end of the shaft, and a protrusion located on an interior wall of the handle that is received within threads of the shaft. The invention also provides a method for tying a twisted clinch knot that includes the steps of providing the aforementioned device, attaching the hook to an article to which a line is to be secured, advancing an end portion of the line through an opening defined by the article, rotating the shaft about the protrusion while holding the handle on one side of the opening and while holding the end portion and a next adjacent portion of the line on the other side of the opening, and passing a part of the end portion through a loop of the line that passes through the opening.

DESCRIPTION OF THE PREFERRED EMBODIMENTS

Figure 1:
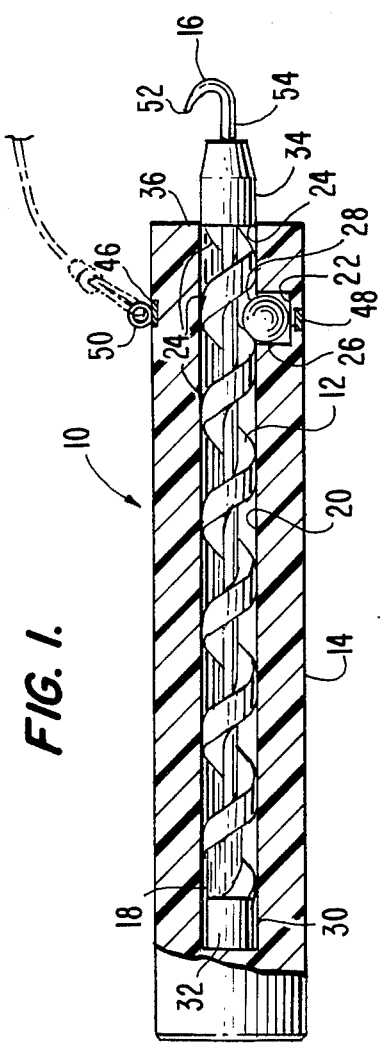
FIG. 1 is a side-view of a preferred embodiment of the present invention, partially cut away.
Figure 2:
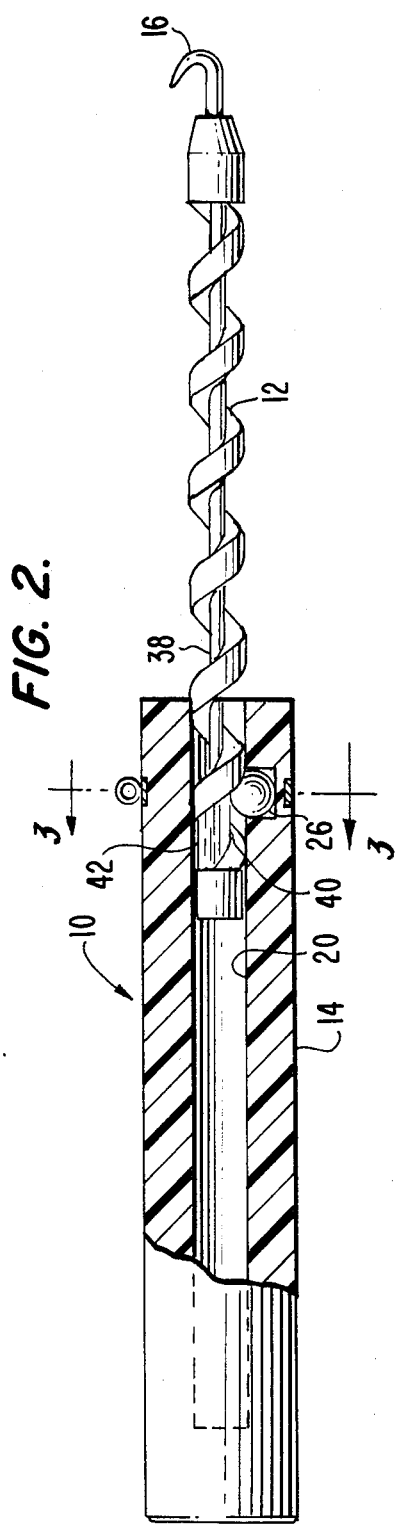
FIG. 2 is a side-view of the invention of claim 1, partially cut away and with an interior shaft extended.
Figure 3:
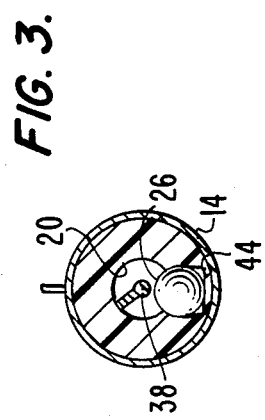
FIG. 3 is a cross-section taken on line 3—3 of FIG. 2.
Figure 4:
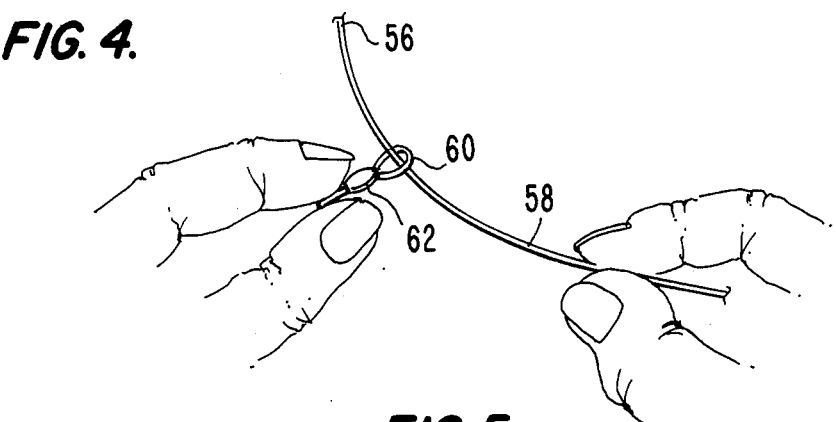
FIGS. 4 through 7 illustrate steps in a method of using the device of FIG. 1.

A preferred embodiment of the present invention is depicted in FIGS. 1 and 2. The invention is a hand-held device 10 that includes a worm shaft 12 and a cylindrical handle 14. The shaft is provided with hook 16 at one end and stop 18 at the other. The shaft is received within a longitudinal bore 20 that is defined by the handle. Cavity 22 is defined within a portion of the wall of bore 20 that is adjacent to open end 24 of the bore. Cavity 22 receives ball 26, a protruding portion 28 of which is received between threads 24 of the worm shaft.

FIG. 1 depicts the device in an initial retracted position, as it would be at the beginning of the method hereinbelow described. In the preferred embodiment, the device is provided with a stop means to allow the worm shaft to readily assume the depicted, initial position and to prevent the hook end from being completely received by the bore. In the depicted embodiment, this stop means consists of the cooperation between bottom 30 of bore 20 and end 32 of the worm shaft. The abutment of the shaft on the bottom of the bore stops the rearward movement of the shaft and thereby defines its rearwardmost position. It will be readily apparent to those skilled in the art that other stop means are also suitable, such as by providing an obstruction between threads of the worm shaft, in the path of protruding portion 28 of the ball, or by increasing the diameter of collar 34 of the shaft such that it comes into contact with front end 36 of the handle.

FIG. 2 depicts the device with the worm shaft extended to a forwardmost position. Further extension of the shaft is prevented by the abutment of protruding portion 28 of ball 26 on stop 18. Stop 18 is provided by gradually increasing the radius of pin 38 of the shaft. As depicted in FIG. 2, as the pin spirals downwardly towards end 32, the radius of the pin is somewhat enlarged at a point 40 where it comes into contact with the protruding portion of the ball and is greatly increased at point 42, at the bottom of the worm. The rate of increase of the radius and the positioning of increase relative to the bottom of the shaft is selected such that the ball will stop the forward movement of the shaft at the desired forwardmost position depicted in FIG. 2.

A desired number of twists is imparted to the knot by positioning stop 18 such that the shaft is allowed to rotate from its initial position a number of times that is the same as the desired number of twists. In the illustrated, preferred embodiment, the initial position is defined by the abutment of shaft end 32 against bore bottom 30. In order to impart the preferred number of five twists, five threads are provided between ball 26 and stop 18. This arrangement allows the shaft to rotate the desired number of times as it is being pulled forward and before its forward movement is arrested.

The specific size of the device is not critical, as long as it is conveniently able to be hand-held by the fishermen. In the depicted embodiment, the overall length of the device is 6¼ inches, and the handle is 1 inch in diameter. The worm shaft is ⅜ inches in diameter, and bore 20 is slightly larger. Ball 26 is ⅜ inches in diameter, and cavity 22 is slightly wider. The distance between pin 38 of the shaft and bottom 44 of the cavity is slightly greater than ⅜ inches, such that the ball does not obstruct the free movement of the pin until it reaches stop 18. In alternative embodiments, numerous variations are made, such as the provision of more than one ball to ride along the worm shaft. Variations such as these will be readily apparent to those skilled in the art and are within the scope of the present invention.

The pitch of the worm shaft is important. As will be seen in the description of the method described hereinbelow, the interaction between ball 26 and shaft 12 must be such that a forwardly directed force, exerted by hand, is sufficient to allow the shaft to freely turn and move forward as the protruding portion of the ball rides the threads of the shaft. In the depicted, preferred embodiment, ball 26 is a steel ball bearing, and shaft 12 is also made of steel, such that there is very little friction between these parts. The threads of the worm shaft are of an approximately ¾ inch pitch, and this is sufficient to allow the free forward movement of the shaft. Other materials are also suitable, especially plastics, and the adjustment of the pitch to accommodate varying frictional interactions between the protrusion and the shaft, such that the protrusion and the shaft do not bind up upon exertion of the forwardly directed force, are well within the ordinary skill of those in the art. The use of lubricants is appropriate for certain materials.

In the depicted embodiment, handle 14 is cylindrical in shape, but it will be readily apparent that other configurations are acceptable. The handle need not extend the entire length of the shaft, it being suitable in an alternative embodiment for it to constitute a graspable collar adjacent to the region of protrusion 28. In the depicted embodiment, the handle is made of a hard plastic, and a label is affixed to the handle that describes the method of use.

Preferably, a means is provided for attaching the device to an article of clothing or piece of equipment. It is preferable that the means for attachment be provided adjacent to open end 24 of the bore, such that the device is held upright and shaft 12 is retained in the handle by gravitational force. In the depicted embodiment, the means for attaching comprises annular groove 46 which receives a 1/16 inch snap ring 48. The snap ring is provided with eyelet 50 which is secured to a retractable angler's reel, which is in turn affixed to the fisherman's jacket.

Hook 16 is preferably tapered and shaped such that it fits differently sized holes, while at the same time holding the hooked article securely while it is turned in the manner described below. Preferably, the taper is such that the diameter of the hook at tip 52 is as small as possible, and the diameter is gradually increased to a diameter of approximately 3/16 inches at point 54. Thus, the hook is provided with a tapered cross-section, the cross-section being smallest at the tip and gradually increasing proximally of the tip. In an alternative embodiment, the hook is replaced by another form of securing means, such as an alligator clip or other clamping device.

It is also within the scope of the invention to provide differently sized knot-tying devices merely by changing the size of the hook. Depending on the type of fishing, the hooks, eyelets, etc. through which hook 16 will be extended vary. Thus, a device with a small hook is generally used for fly fishing, a device with a medium-sized hook is generally used for inland fishing, and a device with a large hook is generally used for ocean fishing. In another embodiment, the hooks are interchangeable, such that the same basic unit is used.

The embodiment depicted in FIGS. 1 and 2. is in a simple form that is inexpensive to manufacture. The shaft rides along the protrusion when a pulling force is exerted manually on the hook, and the shaft is rotated downwardly, back into the handle merely by holding the device upright and allowing gravitational force to act. In an alternative embodiment, a battery-operated motor is used to drive the shaft up and down, and in a still further embodiment, a spring or other means is used to replace the gravitational force for retracting the shaft.

The method of using the device to tie a twisted clinch knot is illustrated in FIGS. 4 through 7. In the depicted embodiment, a line from a reel or hook leader line is to be tied to a barrel swivel. To begin with, the shaft of the device is in its rearwardmost position, as depicted in FIG. 1. A tag end of line 58 is advanced through eyelet 60 of barrel swivel 62, such that an end portion 64, preferably about 2 inches in length, is passed through the eyelet. Hook 16 is also passed through eyelet 60, either before or after the line is advanced.

Figure 5:
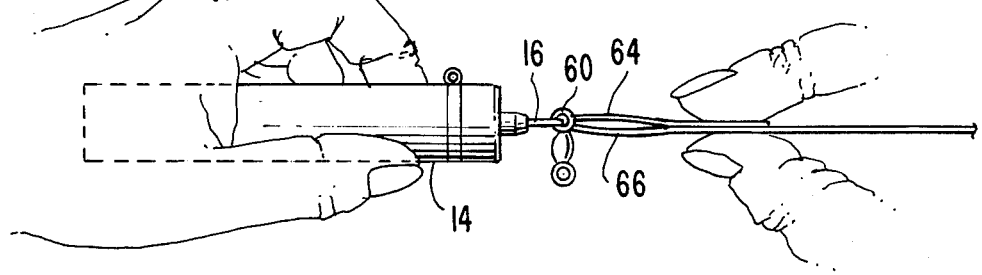

In the next step, the user grasps handle 14 in one hand, and end portion 64 of the line and a next adjacent end portion 66 of the line in the other. This is depicted in FIG. 5. The end portion and next adjacent portion are held in such a way that the end portion is able to twist about the next adjacent portion, and the two portions are preferably held immediately adjacent to each other, as illustrated in FIG. 5.

Figure 6:
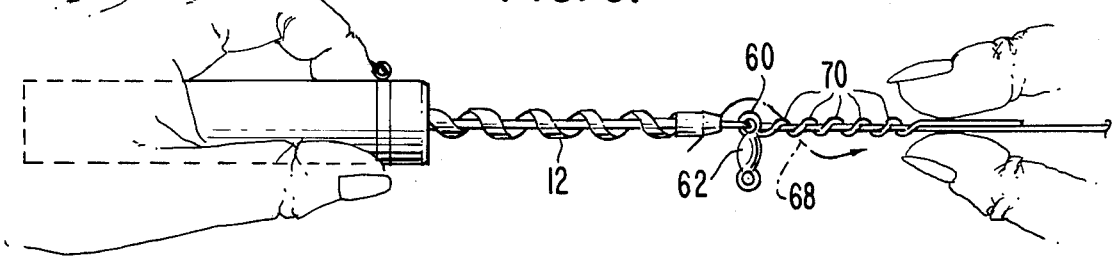
Figure 7:
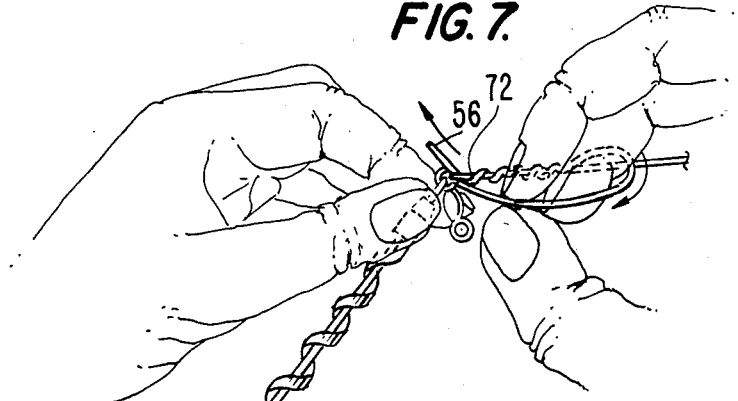

Next, by pulling the hands away from each other, as illustrated in FIG. 6, the shaft is caused to rotate by virtue of protrusion 28 in the direction of arrow 68. The rotation causes eyelet 60, to which the hook is attached, to rotate, and this in turn causes end portion 64 to rotate about next adjacent portion 66. The number of rotations, and therefore the number of twists of the end portion, is determined by the number of threads passing by protrusion 28 in the course of the shaft's movement from the rearwardmost to the forwardmost position. As shown in FIG. 6, the number of twists 70 of end portion 64 is five, which corresponds to the number of passing threads.

Figure 8:
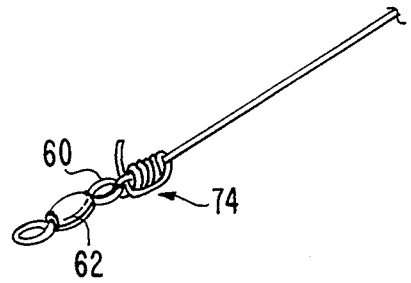
FIG. 8 is a perspective view of a knot tied with the depicted device.

After the shaft reaches its forwardmost position, which is depicted in FIG. 6, tag end 56 and a part of end portion 64 are passed through loop 72, which is defined by sections of portions 64 and 66 that are immediately adjacent to eyelet 60. Loop 72 passes through the eyelet. Finally, the knot is tightened by pulling on the tag end, and excess line of portion 64 is clipped off. The tightening operation is conveniently accomplished by grasping the tag end of the line in one hand and pulling the tool in an opposite direction. The resulting twisted clinch knot 74, having five twists, is illustrated in FIG. 8.

The invention having been fully described in its preferred embodiments, it will be readily apparent to those skilled in the art that numberous modifications of the invention are possible without deviating from the spirit of the invention or the scope of the appended claims.

I claim:

1. A hand-held device for tying a twisted clinch knot comprising a worm shaft, a handle defining a recess shaped to receive said shaft, a first stop means for determining a forwardmost position of said shaft relative to said handle and for retaining a first end of said shaft within said handle, a securing means disposed on a second forward end of said shaft for securing an article to which said knot is to be tied, and a protrusion disposed on an interior wall of said handle that is received within threads of said shaft, wherein said protrusion is maintained in a substantially stationary position relative to said handle and causes said worm shaft to rotate as it moves from a rearward position, relative to said handle, toward said forwardmost position.

2. The device of claim 1 wherein said first stop means is an obstruction disposed between threads adjacent to said first end of said shaft, such that said protrusion is unable to pass by said obstruction.

3. The device of claim 1 wherein said shaft is provided with a second stop means that determines a rearwardmost position of said shaft relative to said handle, such that said first and second stop means allow a predetermined number of threads of said shaft to pass by said protrusion, said number being equal to a number of twists of said knot.

4. The device of claim 3 wherein said second stop means comprises said first end of said shaft and a bottom of a bore of said handle that receives said shaft, whereby said first end abuts said bottom to prevent rearward movement beyond said rearwardmost position.

5. The device of claim 3 wherein said number is five.

6. The device of claim 1 wherein a pitch of said worm shaft is such as to allow said shaft to be moved from said rearwardmost to said forwardmost position by exerting a forwardly directed force on said securing means.

7. The device of claim 6 wherein said pitch is approximately three-quarters of an inch.

8. The device of claim 1 wherein said handle defines a longitudinal bore for receiving said shaft, wherein said protrusion is disposed adjacent to an open end of said bore and protrudes into said bore.

9. The device of claim 8 wherein an outer surface of said handle adjacent to said open end is provided with a means for securing a tie line.

10. The device of claim 1 wherein said securing means is a hook provided with a tapered cross-section, said cross-section being smallest at a tip of said hook and gradually increasing proximally of said tip.

11. The device of claim 1 wherein said protrusion is a portion of a ball retained within a cavity defined by said handle.

12. A method for tying a twisted clinch knot comprising the steps of:

providing a hand-held tying device comprising a worm shaft, a handle defining a recess shaped to receive said shaft, a first stop means for determining a forwardmost position of said shaft relative to said handle and for retaining a first end of said shaft within said handle, a securing means disposed on a second, forward end of said shaft, and a protrusion disposed on an interior wall of said handle that is received within threads of said shaft, said protrusion being initially disposed adjacent to said second end of said shaft;

attaching said hook means to an article to which a line is to be secured;

advancing an end portion of said line through an opening defined by said article;

rotating said shaft about said protrusion while holding said handle on one side of said opening and while holding said end portion and a next adjacent end portion of said line on the other side of said opening, said end portion and said next adjacent portion being held such that said end portion is allowed to twist about said next adjacent portion; and passing a part of said end portion through a loop of said line that passes through said opening.

13. The method of claim 12 wherein said device is further provided with a second stop means for determining a rearwardmost position of said shaft, such that said first and second stop means allow a predetermined number of threads of said shaft to pass by said protrusion, said number being equal to a number of twists of said knot, and wherein said rotating step comprises the step of rotating said shaft and twisting said end portion said number of times.

14. The method of claim 12 wherein, during said rotating step, the method further comprises the step of holding said end portion and said next adjacent portion together.

15. The method of claim 12 further comprising the step of pulling on said part of said end portion following said passing step to thereby tighten a knot so formed.

* * * * *